(12) United States Patent
Germain

(10) Patent No.: US 8,170,867 B2
(45) Date of Patent: May 1, 2012

(54) SYSTEM FOR EXTRACTING INFORMATION FROM A NATURAL LANGUAGE TEXT

(75) Inventor: Nicolas Germain, Villeurbanne (FR)

(73) Assignees: Go-Albert France, Paris (FR); Alain Beauvieux, Saint Mande (FR); Eric Fourboul, Montpellier (FR)

( * ) Notice: Subject to any disclaimer, the term of this patent is extended or adjusted under 35 U.S.C. 154(b) by 1771 days.

(21) Appl. No.: 10/524,624

(22) PCT Filed: Jul. 18, 2003
(Under 37 CFR 1.47)

(86) PCT No.: PCT/CH03/00490
§ 371 (c)(1),
(2), (4) Date: Jan. 26, 2006

(87) PCT Pub. No.: WO2004/010324
PCT Pub. Date: Jan. 29, 2004

(65) Prior Publication Data
US 2011/0099001 A1   Apr. 28, 2011

(30) Foreign Application Priority Data

Jul. 19, 2002  (EP) .................................. 02405626

(51) Int. Cl.
*G06F 17/27* (2006.01)
(52) U.S. Cl. ....... 704/9; 704/1; 704/10; 704/8; 715/255; 715/264

(58) Field of Classification Search ............ 704/1, 8–10; 715/255, 264
See application file for complete search history.

(56) References Cited

U.S. PATENT DOCUMENTS

| | | | |
|---|---|---|---|
| 4,864,501 A | 9/1989 | Kucera et al. | |
| 5,960,383 A | 9/1999 | Fleischer | |
| 6,658,377 B1 * | 12/2003 | Anward et al. | 704/9 |
| 6,745,161 B1 * | 6/2004 | Arnold et al. | 704/7 |
| 6,901,402 B1 * | 5/2005 | Corston-Oliver et al. | 1/1 |
| 6,910,003 B1 * | 6/2005 | Arnold et al. | 704/4 |
| 7,058,564 B2 * | 6/2006 | Ejerhed | 704/1 |
| 7,171,349 B1 * | 1/2007 | Wakefield et al. | 704/9 |
| 2002/0082828 A1 * | 6/2002 | Hejna, Jr. | 704/211 |
| 2003/0004716 A1 * | 1/2003 | Haigh et al. | 704/238 |
| 2003/0078766 A1 * | 4/2003 | Appelt et al. | 704/9 |
| 2004/0221235 A1 * | 11/2004 | Marchisio et al. | 715/534 |

FOREIGN PATENT DOCUMENTS

| | | |
|---|---|---|
| EP | 0702289 A | 3/1996 |
| EP | 0822503 A | 2/1998 |

* cited by examiner

*Primary Examiner* — David R Hudspeth
*Assistant Examiner* — Lamont Spooner
(74) *Attorney, Agent, or Firm* — Clifford W. Browning; Krieg DeVault LLP

(57) ABSTRACT

In the method of extraction, the words of the text are encoded by comparing them with the contents of a lexicon of tool words (essentially articles, prepositions, conjunctions, and verbal auxiliaries), and nominal groups are then identified by searching subsets of the resulting succession of encoded words to look for groups of encoded words that comply with predefined syntactical rules.

11 Claims, 1 Drawing Sheet

SYSTEM FOR EXTRACTING INFORMATION FROM A NATURAL LANGUAGE TEXT

The present invention relates to a system for extracting information from a natural-language text, with a view to selecting those words or those groups of words in the text which best describe the subjects addressed in the text. Such words or groups of words can be referred to as "keywords" and they are, in particular, usable for the purposes of indexing the text in a documentary database, in particular for automatically summarizing the text, for categorizing it, or for any other attempt at knowledge representation.

Known information extraction systems that attempt to achieve these objectives use analysis methods of the following three types:

statistical analysis methods that attempt to elect the most representative words of the text by counting their frequencies of occurrence, and by keeping only those whose frequency is neither too low nor to high;
   thesaurus analysis methods which operate using a predefined representation of knowledge and which are based on prior definition of a structured reference lexicon or "thesaurus". Such a thesaurus is defined entirely manually and must be defined in each specialty field;
   pattern-recognition analysis methods that operate using statistical identification of patterns.

Comparative operation of those three types of analysis methods is illustrated below by analyzing the following text:

"<<cats>>, l'une des comédies musicales les plus longtemps a l'affiche, va tirer sa révérence après vingt et une aanées sur la scéne londonienne. La derniére representation de cette œuvre d'Andrew Lloyd Webber aura lieu le 11 mai, jour de son 21e anniversaire, après quelque 9 000 représentations. L'annonce a été faite trois jours après la dernière représentation de <<Starlight Express>>, la seconde comédie musicale la plus longtemps à l'affiche à Londres, après dix-huit années our les planches.

La fin de <<cats>> est un coup dur supplémentaire pour le quartier de Covent Garden, où sont regroupés la plupart des théâtres londoniens, et qui a souffert d'une forte baisse de fréquentation en 2001. Depuis 1981, année de son lancement, la comédie musicale a, depuis, été interprétée devant plus de 50 millions de spectateurs en 11 langues et dans 26 pays."

(source: Reuter)

The following is a translation into English of the above text:

"Cats", one of the musical comedies that have been on the bills for the longest, is bowing out after twenty-one years on the London stage. The last performance of this work composed by Andrew Lloyd Webber will be given on May 11, its 21$^{st}$ anniversary, after some 9000 performances. The announcement was made three days after the last performance of "Starlight Express", the musical comedy that has been on the London bills for the second longest time, after eighteen years on the boards.

The closure of "Cats" is a further blow for the Covent Garden district, in which most of London's theaters are located, and which suffered a sharp downturn in ticket sales in 2001. Since 1961, the year it opened, this musical comedy has been performed for over 50 million spectators, in 11 languages and in 26 countries."

(source: Reuters (translated into English from the French))

Operation of Statistical Analysis Methods:

If we consider their approaches in caricatured manner, statistical analysis methods count the words in the text and keep only those whose frequency is neither too low nor too high, while sometimes removing tool words (articles, prepositions, conjunctions, and verbal auxiliaries) in order to hone down the results. As regards the text proposed above, the words of "medium" frequency (without taking the tool words into account) are then as follows:

bills, years, Cats, comedy, last, longest, musical and performance.

Although the main advantage of statistical analysis methods lies in their great algorithmic simplicity, their main disadvantage lies in the low degree of pertinence of their results. The words of "medium" frequency in a text are rarely the most representative. However, those methods can give better results on texts that are longer than the text given by way of example above.

In addition, because the text is subdivided into words, i.e, into strings of characters whose delimiters are spaces, the semantic links that can link up words, e.g. the words "musicale" and "comedy" are lost.

Operation of Thesaurus Analysis Methods:

Those methods are based on prior definition of a structured reference lexicon or "thesaurus". As mentioned above, such a thesaurus is defined entirely manually and should be defined in each specialty field.

For example, let us imagine the following thesaurus:

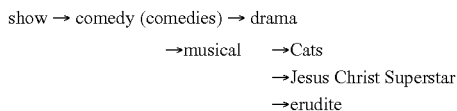

With that type of method, it is always possible to identify those words of the source text which are found in exactly the same form in the thesaurus. The advantage of that type of method is that it is possible to be sure that the identified words correspond to an established and listed cultural or scientific reality. In addition, it is possible to deduce a federative word such as "show" which is not part of the initial text, but which characterizes it correctly. Unfortunately, the major drawback with such a method is that the thesaurus must be continuously updated so that it remains pertinent, which gives rise to high maintenance costs. Another major drawback with such a method lies in the fact that a thesaurus compiled for analyzing texts in the field of chemistry cannot be used for texts in the field of electronics, for example. In addition, when the thesaurus is not exhaustive, certain expressions that can be very pertinent are not recognized as being so.

Operation of Pattern-Recognition Analysis Methods:

Known pattern-recognition analysis methods are methods of statistically identifying patterns. Although they considerably improve the above-mentioned statistical analysis methods, by keeping trace of word pairing, such as, for example, the terms "musical" and "comedy" of the above example, they do not make it possible to analyze short texts correctly. Statistical methods need quantity in order to operate properly.

For example, the keywords of the text given by way of example are obtained by rough comparison of sequences of various lengths. The tool words (the, etc.) do not count, and the sequences are formed on the basis of one word, plus three or less words:

Cats
Cats musical
Cats musical comedies
Cats musical comedies bills
musical
musical comedies
musical comedies bills musical comedies bills longest
comedies
comedies bills
comedies bills longest
comedies bills longest bowing
etc. . . .

It then suffices to group together the various sequences obtained, by approximation on the form (e.g. "comedies" and "comedy"), and to count the most frequent combined expressions such as "musical comedies".

An object of the present invention is to propose a system for extracting information from a natural-language text, which system makes it possible to remedy the drawbacks of known analysis methods, by making it possible, in particular, for both short and long texts to be analyzed with good quality.

This system uses an analysis method using pattern-identification analysis, and not only statistical analysis, but also syntactical analysis.

To summarize, the proposed system converts the words of the text into a succession of syntactical categories, and then compares subsets of the text with predefined syntactical patterns, so as to identify nominal groups without prejudging the importance of the words that make up said groups.

Thus, the words "potatoes" or "power electronics" are not important in themselves, but rather they are important relative to the text in which they occur. In a general text, "power electronics" can be merely an example, and not a keyword of the text, whereas it is probably a keyword in a text dealing with transistors. It is the context that makes the keyword, and the system of the present invention includes a sort of syntactical context analyzer. Similarly, the word "bearing" may be recognized as being nominal in certain contexts because of its position relative to the other words in the text, or merely as a structural word in other texts.

A pattern-identification analysis method is proposed in Patent Document U.S. Pat. No. 4,864,501. The method described in that prior document uses a dictionary containing base forms for encoding the words of the text with a view to identifying patterns. In addition to the fact that that dictionary is very voluminous because it contains several tens of thousands of entries, that method requires complex algorithms for retrieving the base forms of the words, which algorithms are specific to each language, in order to find words in the dictionary, and that method can require specific prefix/suffix tables for coping with spelling mistakes, etc. Therefore, that method is very complex to implement and to use.

The extraction system of the present invention makes it possible to remedy those drawbacks.

To this end, the invention provides a method of extracting information from a natural-language text, by identifying patterns, in which method the words of the text are encoded by comparing them with the contents of a predefined lexicon containing a few tens of tool words, and nominal groups are then identified by searching subsets of the resulting succession of encoded words to look for groups of encoded words that comply with predefined syntactical rules.

The invention also provides a system for extracting information from a natural-language text, said system comprising:

an input unit for receiving said natural-language text;

a lexicon file in which tool words are recorded;

an analysis processor connected to said input unit, and to the lexicon file, and organized to act in a first stage to encode the words of the natural-language text by evaluating the grammatical function of each word by comparing it with the contents of said lexicon file of tool words, so as to identify the tool words in the text and so as to evaluate the functions of the usage words which are not recognized as being tool words, by comparing their locations relative to the locations of the words recognized as being tool words, and, in a second stage, to search subsets of the resulting succession of encoded words to look for groups of encoded words that comply with predefined syntactical rules, so as to identify nominal groups; and an output unit connected to said analysis processor for receiving the groups of encoded words recognized as being syntactical patterns.

The extraction system of the invention evaluates the grammatical functions of the words of the text to be analyzed by means of a predetermined lexicon containing the few tens of tool words that are specific to each language and that are essentially constituted by articles, prepositions, conjunctions, and verbal auxiliaries. The functions of the other words are then deduced merely by means of the locations of the tool words. Since the tool words of a text commonly represent 40% to 50% of the words of the text, the number of said tool words is thus always high enough to enable the other words to be evaluated. Then, only those portions of the text whose grammar is identified as being possible keywords are kept.

The extraction system of the invention offers numerous advantages. In particular, the lexicon of tool words that is used by the system is incomparably smaller than the dictionaries containing thousands of words that are used by known systems. It should also be noted that no human intervention is necessary in order to determine the keywords, that the system can operate for texts in various languages, and that, apart from the lexicon of tool words, it does not require any other lexicon. In addition, since the semantic and grammatical values of the tool words are set and hardly ever change over several decades, maintenance of the lexicon is very limited. Conversely, the values of the other words that might be termed "usage words" (verbs, nouns, adjectives), change continuously over time, as a function of usage, as a function of changes in trades or in sciences, or merely as a function of current affairs. Since the system of the present invention makes no presupposition about the values of usage words, it operates identically in all fields, be they literary, technical, or scientific, whereas systems using known methods must always be enriched with specialist lexicons that are often custom-made. Finally, this system of extraction makes it possible to address new languages incomparably more rapidly than any other prior system does.

In addition, unlike systems using statistical analysis methods in which the frequency of occurrence of the words is a selection criterion, which assumes that the text is long enough, the system of the invention considers frequency of occurrence of words to be of only minor importance, and it operates both for long texts that are several tens of pages long, and for short texts that are a few lines long.

By way of example, a description follows of a system of the invention for extracting information from a natural-language text, the description being given with reference to the drawing, in which.

Figure 1:
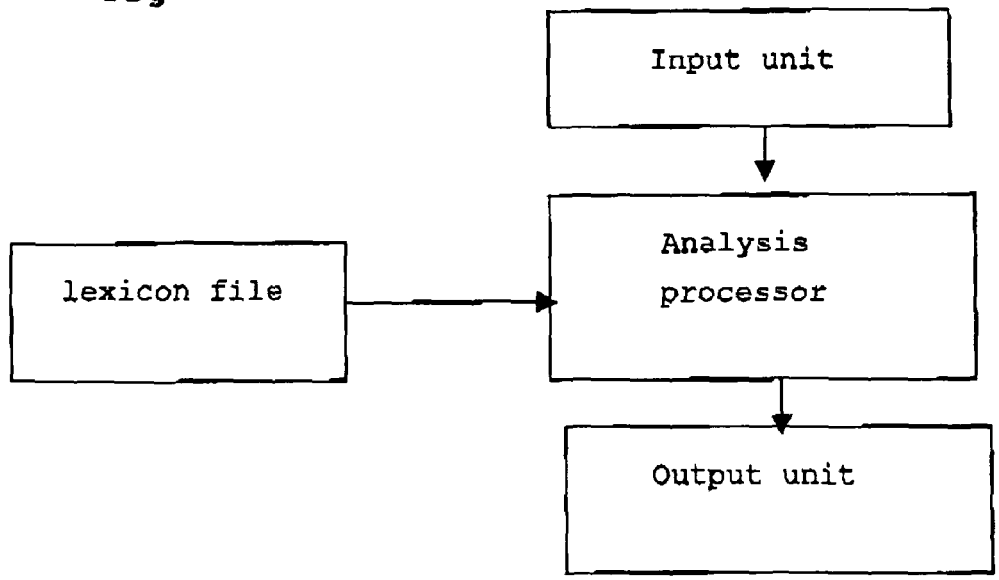
FIG. 1 is a block diagram of the extraction system of the invention.
Figure 2:
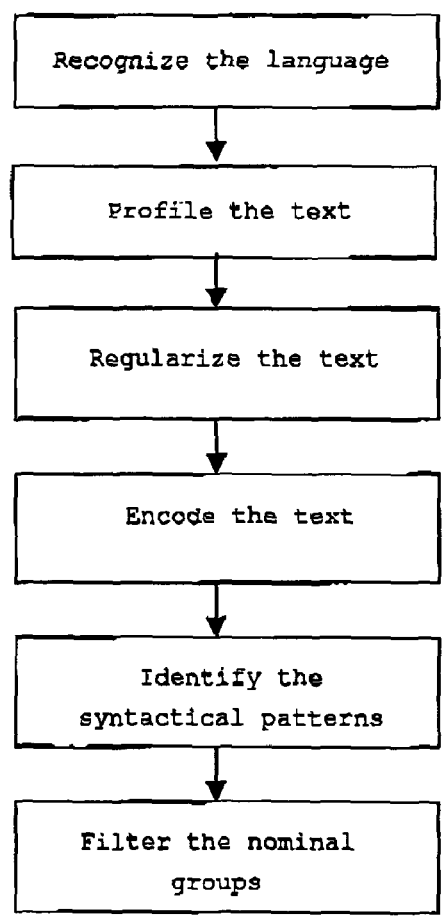
FIG. 2 is a block diagram of the steps of an implementation of the method of the invention.

Using a syntactical model requires the language of the text under analysis to be recognized. This is thus naturally the first operation performed by the extraction system of the invention. Said language recognition can be based merely on statistical criteria of co-occurrence of letters. Recognizing languages, e.g. English, Spanish, French, Portuguese, German, or Italian, makes it possible to guide the analyses that are to be performed downstream.

The next step is a text-profiling step that makes it possible to identify the lines of text (paragraphs) that include linguistic information, and to group paragraphs together. This operation is particularly useful for texts that are structured (with titles, subtitles, etc.), because it makes it possible to group paragraphs together consistently. Said operation is unnecessary for short texts.

The next step consists of a regularization operation for regularizing the text, during which amalgams of signs are removed, e.g. the typographic characters are separated from the alphabetic characters. For example, it is useful to recognize the chain "word," as being the term "word" followed by ",", while the chain "1.5" should be recognized as being a numeral.

In the text given by way of example, this step involves separating the typographical characters (e.g. ","; """; and ".") from the other words by blank spaces. The text given by way of example then becomes:

in French:

"<<Cats>>, l'une des comédies musicales les plus longtemps à l'affiche, va tirer sa révérence après vingt et une années sur la scène londonienne. La dernière représentation de cette œuvre d Andrew Lloyd Webber aura lieu le 11 mai, jour de son 21e anniversaire après quelque 9 000 représentations. L'annonce a été faite trois jours après la dernière représentation de <<Starlight Express>>, la seconde comédie musicale la plus longtemps à l'affiche à Londres, aprés dix-huit années sur les planches.

La fin de <<Cats>> est un coup dur supplémentaire pour le quartier de Covent Garden, où sont regroupés la plupart des théâtres londoniens, et qui a souffert d'une forte baisse de fréquentation en 2001. Depuis 1981, année de son lancement, la comédie musicale a, depuis, été interprétée devant plus de 50 millions de spectateurs en 11 langues et dans 26 pays."

in English:

""Cats", one of the musical comedies that have been on the bills for the longest, is bowing out after twenty-one years on the London stage. The last performance of this work composed by Andrew Lloyd Webber will be given on May 11, its $21^{st}$ anniversary, after some 9000 performances. The announcement was made three days after the last performance of "Starlight Express", the musical comedy that has been on the London bills for the second longest time, after eighteen years on the boards.

The closure of "Cats" is a further blow for the Covent Garden district, in which most of London's theaters are located, and which suffered a sharp downturn in ticket sales in 2001. Since 1981, the year it opened, this musical comedy has been performed for over 50 million spectators, in 11 languages and in 26 countries."

The next step, which constitutes a key step for the system, consists in determining the category of each word. By means of the limited lexicon of tool words, the words of the text are encoded on the basis of the grammatical categories attributed as a function of the syntactical values of the words. Firstly, the tool words of the lexicon are recognized in the text, and then the functions of the other words in the text are deduced from their locations relative to the already-recognized tool words.

Thus, if we adopt, for example, the following categories:
s: structure word (tool word not useful for the remainder of the analysis)
d: determiner (the, a, any, etc. [in French "le, la, les", etc.])
p: preposition (of, in, by, etc. [in French "de, en, par", etc.])
4: opening or closing sign
1 or 2: punctuation
3: apostrophe
N: numeral
W: proper noun
w: common noun
c: amalgam or contracted form (no occurrence in the English text [in French "du, des, au, aux", etc.])
a: back-reference or anaphor (this, its, etc. [in French "ce, cet, ces", etc.])
*: code attributed if none of the above categories are recognized The text in French that is given by way of example above thus becomes:
4 W 2 4 2 d 3 d c w3 w4 d w1 w2 p d 3 w3 2 s w2 a w4 w2 w1 p d w2 p d w2 w4 1 d w3 w5 p a w2 p 3 W W W w2 w1 d N w1 2 w1 p a * w5 2 w2 d N N w5 1 d 3 w3 s w2 w2 d w1 w2 d w3 w5 p 4 W W 4 2 d w3 w3 w4 d w1 w2 p d 3 w3 p W 2 w2 d 0 d w2 p d w2 1 d w1 p 4 W 4 s d w1 w1 w5 p d w2 p W W 2 s s w3 d w2 c w2 w3 2 p s s w2 p 3 d w2 w2 p w4 p N 1 W N 2 w2 p a w3 2 d w3 w4 s 2 w2 2 w2 w4 w2 w1 p N w2 p w3 p N w2 p p N w1 1

A next step consists in identifying the linguistic structures known as "nominal syntagms" in linguistics terminology or, more simply, as "nominal group".

The entire set of syntactical patterns that are worth identifying constitutes the analysis grammar. Since the grammar for the French example is common to all of the Romance languages, it is possible to analyze a large number of languages by using the same extraction system of the invention without requiring any complex adaptation.

By way of example, a (simplified) grammar can take the following form:

(1) nominal syntagm-> determiner, nominal group; W.
(2) determiner-> d; d, 3) numeral; c; a
(3) d->'the'; 'some'; 'any'; 'a'; etc. . . .
[in French;
(3) d-> 'le'; 'la'; 'les'; 'des'; 'l'; etc. . . . ] (3bis) not suitable in English
[in French:
(3bis) c-> 'du'; 'au'; 'aux'; etc. . . . ] (3ter) a-> 'this'; 'these'; 'that'; 'those' 'its'; etc. . . .
[in French:
(3ter) a-> 'ce' 'cette' 'ces'; 'son'; etc. . . . ]
(4) nominal group-> expression, nominal group.
(5) expression-> w, p, w: w.
(6) p->'from'; 'to'; 'for') 'without'; etc. . . .
[in French;
(6) p-> 'de'; 'à'; 'pour'; 'sans'; etc. . . . ]

The arrow reads "is rewritten", the comma reads "followed by", the semi-colon means a "or", and the period marks the end of the rule. Rule (1) reads "nominal syntagm is rewritten determiner followed by nominal group".

Rules (3) and (6) are said to be "terminal rules" because they make use of the lexical forms of the lexicon of tool words.

Rule (4) is a recursive rule. A nominal group can thus contain an infinite number of expressions, which, according to Rule (5) are either of the wpw type or of the w type.

The following successions of grammatical categories are thus recognized as being nominal groups;

```
d w
d w p w
d w w
d w w p w
d 3 w w
etc . . .
```

In the text given by way of example, the nominal groups identified by means of this grammar are underlined:
French Version:
<<Cats>>, l'une des comédiesmusicales les plus longtemps a l'affiche, va tirer sa révérence après vingt et une années sur la scènelondonienne. La dernièrereprésentation de cette œuvred'AndrewLloydWebber aura lieu le 11 mai, jour de son 21eanniversaire, après quelques 9000représentations. L'annonce a été faite trois jours après la dernièrereprésentation de <<StarlightExpress>>, la secondecomédiemusicale la pluslongtemps à l'afficheàLondres, après dix-huit années sur les planches.
La fin de <<Cats>> est un coupdursupplémentaire pour le quartierdeCoventGarden, où sont regroupés la plupart des théâtreslondoniens, at qui a souffert d'une fortebaissedefréquentationen2001. Depuis 1981, année de son lancement, la comédiemusicale a, depuis, été interprétée devant plus de 50 millionsdespectateurs en 11 langues et dans 26 pays.
(source Reuter)
English Version:
"Cats", one of the musicalcomedies that have been on the bills for the longest, is bowing out after twenty-one years on the Londonstage. The lastperformance of this workcomposedbyAndrewLloydWebber will be given on May 11, its 21$^{st}$anniversary, after some 9000performances. The announcement was made three days after the lastperformance of "StarlightExpress", the musicalcomedy that has been on the Londonbills for the secondlongesttime, after eighteen years on the boards.
The closure of "Cats" is a furtherblow for the CoventGardendistrict, in which most ofLondon'stheaters are located, and which suffered a sharpdownturninticketsalesin2001. Since 1981, the year it opened, this musicalcomedy has been performed for over 50 millionspectators, in 11 languages and in 26 countries.
(source: Reuters (translated into English from the French))

Since the nominal groups represent approximately 50% of the text, it is necessary to keep only those for which the probability of them being genuine keywords of the text is the highest.

A next step can consist in filtering the nominal groups. Not all of the nominal groups have the same referential capacity. Some are more important than others. In order to determine which of them are the most important, the system of the invention evaluates the importance of each nominal group as a function of two criteria, one of which is statistical, and the other is syntactical.
The Statistical Criterion:
The most frequently occurring words of the nominal groups are classified in decreasing order of frequency (while taking account of approximations such as 'comedy'='comedies'), i.e., in the text given by way of example:

| | |
|---|---|
| comedy | 3 |
| musical | 3 |
| bills | 2 |
| years | 2 |
| Cats | 2 |
| last | 2 |
| performance | 2 |

Only those words whose occurrence exceeds 1 are kept in the list. The words removed thus have zero value. The value of each nominal group (initially set at 0) is added to the values of the occurrences of the words that it contains, minus 1. The values of the nominal groups thus become:

| | |
|---|---|
| musical comedy | (3 − 1) + (3 − 1) = 4 |
| bills | 2 − 1 = 1 |
| London bills | 2 − 1 = 1 |
| Cats | 2 − 1 = 1 |
| etc . . . | |

The Syntactical Criterion:
When a nominal group is, or contains a proper noun, then the proper noun takes an additional point of value. Otherwise it takes 0.

| | |
|---|---|
| musical comedy | 4 + 0 = 4 |
| bills | 1 + 0 = 1 |
| London bills | 1 + 1 = 2 |
| Cats | 1 + 1 = 2 |
| etc . . . | |

With this evaluation, it is easy to classify the nominal groups. In the text given by way of example, the nominal groups perceived to be the most important are double-underlined, the groups deemed to be of secondary importance are single-underlined, while the others are simply eliminated.
French Version:
<<Cats>>, l'une des comédiesmusicales les plus longtemps a l'affiche, va tirer sa révérence après vingt et une années sur la scènelondonienne. La dernièrereprésentation de cette œuvred'AndrewLloydWebber aura lieu le 11 mai, jour de son 21eanniversaire, après quelque 9000représentations. L'annonce a été faite trois jours après la dernièrereprésentation de <<StarlightExpress>>, la secondecomédiemusicale la plus longtemps à l'afficheàLondres, après dix-huit années sur les planches.
La fin de <<Cats>> est un coup dur supplémentaire pour le quartierdeCoventGarden, où sont regroupés la plupart des théâtreslondoniens, et qui a souffert d'une forte baisse de fréquentation en 2001. Depuis 1961, année de son lancement, lacomédiemusicale a, depuis, été interprétée devant plus de 50 millions de spectateurs en 11 langues et dans 26 pays.
(source Reuter)
English Version:
"cats", one of the musical comedies that have been on the bills for the longest, is bowing out after twenty-one years on the Londonstage. The lastperformance of this workcomposedbyAndrewLloydWebber will be given on May 11, its 21$^{st}$anniversary, after some 9000performances. The announcement was made three days after the lastperformance of "StarlightExpress", the musicalcomedy that has been on the Londonbills for the second longest time, after eighteen years on the boards.

The closure of "Cats" is a further blow for the CoventGardendistrict, in which most of London'stheaters are located, and which suffered a sharp downturn in ticket sales in 2001. Since 1981, the year it opened, this musicalcomedy has been performed for over 50 million spectators, in 11 languages and in 26 countries.

(source: Reuters (translated into English from the French))

The invention claimed is:

1. A method implemented by computer of extracting information from a natural-language text of words comprising identifying patterns, wherein the words of the text are encoded by comparing them, using a processor, with the contents of a predefined lexicon containing less than 1000 tool words, said tools being essentially constituted by articles, prepositions, conjunctions and verbal auxiliaries, and in that nominal groups are then identified by searching subsets of the resulting succession of encoded words to look for groups of encoded words that comply with predefined syntactical rules, wherein the words of the text are encoded by evaluating the grammatical function of each word by comparing each word with the contents of said lexicon of tool words, so as to identify the tool words in the text, the grammatical function of said tool words being predefined, and in that the grammatical functions of the other words, which are not recognized as being tool words, are deduced by comparing their locations relative to the words recognized as being tool words.

2. A method according to claim 1, wherein the identified nominal groups are then evaluated so as to keep only those groups which are perceived as being the most important, by using predefined evaluation criteria.

3. A method according to claim 1, wherein the identified nominal groups are then evaluated so as to keep only those groups which are perceived as being the most important, by using predefined evaluation criteria.

4. A system for extracting information from a natural-language text, said system comprising:
   an input unit for receiving said natural-language text;
   a lexicon file in which less than 1000 tool words with predefined grammatical functions are recorded, said tool words being essentially constituted by articles, prepositions, conjunctions and verbal auxiliaries;
   an analysis processor connected to said input unit, and to the lexicon file, and organized to act in a first stage to encode the words of the natural-language text by evaluating the grammatical function of each word by comparing each word with the contents of said lexicon file of tool words, so as to identify the tool words in the text and so as to evaluate the functions of the other words which are not recognized as being tool words, by comparing their locations relative to the locations of the words recognized as being tool words, and, in a second stage, to search subsets of the resulting succession of encoded words to look for groups of encoded words that comply with predefined syntactical rules, so as to identify nominal groups; and
   an output unit connected to said analysis processor for receiving the groups of encoded words recognized as being syntactical patterns.

5. A system according to claim 4, wherein the analysis processor further comprises means for evaluating the importance of the kept groups of encoded words in order to keep only those groups which are perceived as being the most important.

6. A system according to claim 5, wherein the analysis processor further comprises means for recognizing the language of the text received at the input unit.

7. A system according to claim 6, wherein the analysis processor further comprises means for regularizing the text received at the input unit so as to remove the amalgams of signs.

8. A system according to claim 5, wherein the analysis processor further comprises means for regularizing the text received at the input unit so as to remove the amalgams of signs.

9. A system according to claim 4, wherein the analysis processor further comprises means for recognizing the language of the text received at the input unit.

10. A system according to claim 9, wherein the analysis processor further comprises means for regularizing the text received at the input unit so as to remove the amalgams of signs.

11. A system according to claim 4, wherein the analysis processor further comprises means for regularizing the text received at the input unit so as to remove the amalgams of signs.

* * * * *